March 22, 1966     J. R. ERWIN     3,241,771
THRUST DEFLECTOR AND REVERSER
Filed Sept. 18, 1963
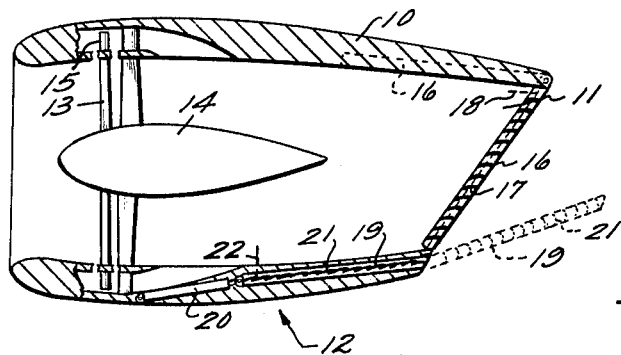
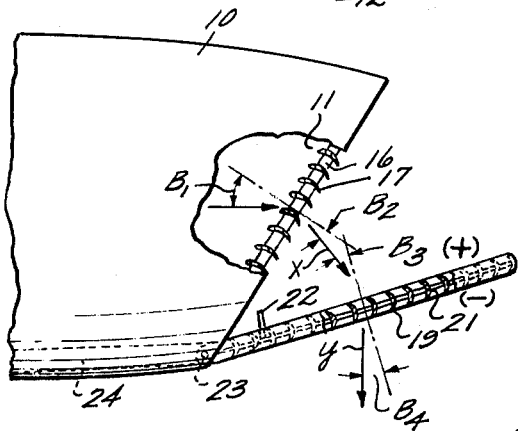
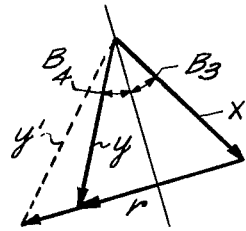
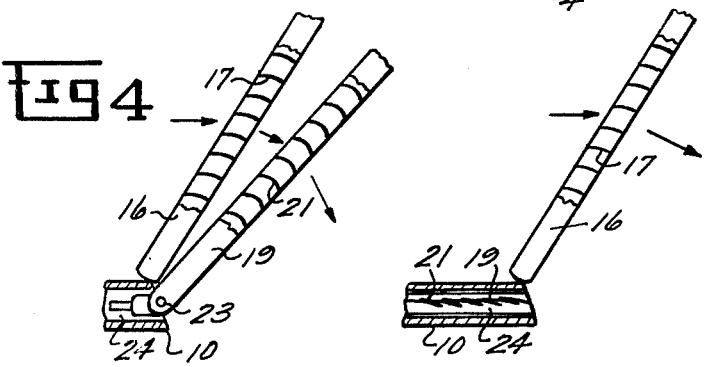
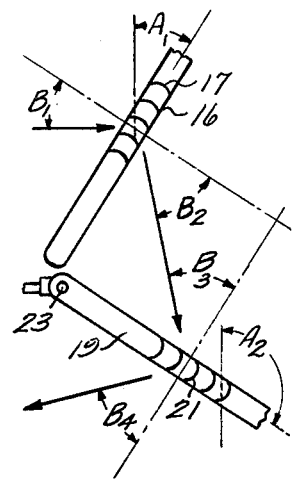
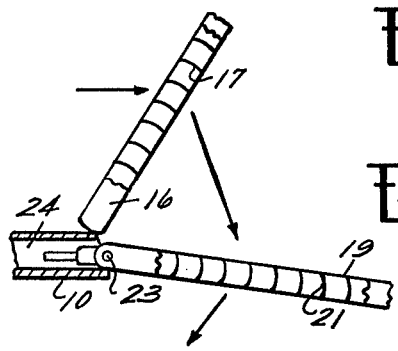
INVENTOR.
JOHN R. ERWIN
ATTORNEY—

United States Patent Office 3,241,771
Patented Mar. 22, 1966

3,241,771
THRUST DEFLECTOR AND REVERSER
John R. Erwin, Wyoming, Ohio, assignor to General
Electric Company, a corporation of New York
Filed Sept. 18, 1963, Ser. No. 309,657
10 Claims. (Cl. 239—265.25)

The present invention relates to a thrust deflector, and more particularly, to a thrust deflecting means for a jet propulsion powerplant especially of the cruise fan type in which the deflecting is done in one or two stages. Additionally, the thrust deflector may be used for obtaining reverse thrust.

A typical powerplant considered for aircraft propulsion is the type known as a cruise fan. Generally, this is a powerplant in which a large fan is surrounded by a tubular casing member or nacelle and the fan is driven to pump air through the casing and provide thrust. Conveniently, the fan may be of the tip turbine type where turbine buckets are mounted on the end of the fan blades and are driven by exhaust gas from gas geneartor means that may be located elsewhere. Additionally, straight turbojets or turbofans may be used as well as ducted propellers. Such cruise fan powerplants are highly efficient and move large quantities of air at low velocities. Additionally, in an aircraft employing such powerplants, it is desirable to provide a vertical component of thrust or lift and this may be done by rotating the whole engine, be it a jet engine or a cruise fan, in a well known manner. The difficulty with rotating a cruise fan in its nacelle or casing is that cruise fans of the tip turbine type are generally quite large both in diameter and length. Rotation is not practical as the powerplant might strike the ground, its proximity to the ground creates undesirable back pressures, and rotation requires very large actuation forces as well as mechanism to provide the rotation. Furthermore, in some installations, it may be desirable to have the nacelle or casing member straddle the wing so rotation is not possible. In other words, the wing may cut the nacelle substantially in half with half of the nacelle above and half below the airfoil or wing. Other mounting arrangements may carry the powerplant on pylons as is well known. With such mounting of the powerplants, thrust reversal is still desired for slowing the aircraft in landing. Additionally, it is desired to obtain vertical (VTOL) thrust from the powerplant as well as highly deflected thrust for short take-off and landing (STOL) aircraft. The usual form of mounting the powerplant does not permit or desire rotation of the entire powerplant and a more practical means of obtaining vertical thrust or highly deflected thrust from the propulsive fluids in such powerplants is to divert or deflect the fan stream or thrust fluid downward and/or forward.

The cruise fan is different from an ordinary jet engine in that it is a low pressure ratio device and is quite sensitive to back pressure. That is, structure imposed behind the fan to turn or deflect the flow downward must impose little or negligible losses or the back pressure on the fan is increased and this results in a performance loss. An effective way to turn the flow is through a cascade of impulse louvers. A cascade of the impulse type can turn the flow without any appreciable pressure drop. Such a cascade merely consists of a series of preferably airfoil louvers that may be fixed in a frame or made to rotate in a frame or whose camber may be changed. Generally, such cascades with louvers therein are well known. In some installations, it may be necessary to use a long, many-louvered cascade for sufficient deflection. This creates a large structural member which requires large actuation forces and presents a stowage problem. It is possible, however, to obtain as much deflection and more by the use of tandem cascades and deflection in two stages.

Projecting cascades across the fluid exhaust stream creates a problem of what to do with the cascades when deflected thrust is not desired from the powerplant. In other words, during the cruise mode, the cascades must be stowed out of the way in a practical manner or must impose little or negligible blockage so as not to affect fan operation. In operation, the cascade desirably must intercept the fluid stream at an angle, for example 67° to the horizontal, which, in conjunction with the camber of the individual louvers, may deflect the flow 90° or more with little pressure change across the fan. Additional turning beyond 90° by a different camber or by movable louvers, as well as a different angle of the cascade frame, or the use of a separate tandem cascade, may provide thrust reversing in a jet propulsion powerplant.

The present invention is directed to a thrust deflection means for a jet propulsion powerplant preferably of the cruise fan type although it is not limited to cruise fans but is applicable to jet propulsion generally. A cruise fan powerplant is described primarily for purposes of illustration and because it is a type of powerplant in which the thrust deflection means of the instant invention finds practical application.

The primary object of the present invention is to provide a thrust deflection means which employs two cascades easily stowed within the confines of the powerplant to deflect the thrust fluid moving horizontally or longitudinally through the powerplant in one or two stages.

Another object is to provide a thrust deflection means using one fixed cascade completely across the exhaust opening and a second movable cascade that may be used for vertical take-off or short take-off and then stowed during cruise operation.

A further object is to provide a thrust deflection means of the type described in which the actuation forces for the movable cascade may be maintained very low by virtue of the construction of the cascade.

A further object is to provide such a thrust deflection means wherein the structure of the movable cascade is such as to produce aerodynamic forces to assist in moving the cascade in the desired direction to simplify the moving mechanism.

Another object is to provide such a structure which permits wide vectoring of the fluid by using the cascades in different intermediate angular fluid intercepting positions.

Briefly stated, the invention is directed to a jet propulsion powerplant, typically of the cruise fan variety, which has a casing member which terminates in a preferably rectangular opening at its downstream end. Means, such as a fan, are provided to move fluid through this casing to provide horizontal thrust. On such a powerplant a thrust deflection means is provided comprising a single flat or planar louvered cascade preferably fixed completely over the opening and at an angle to the horizontal fluid movement through the opening. The cascade is provided with variable cambered louvers across or transverse to the opening and suitable actuating means connected to the louvers varies the chambers of all the louvers simultaneously to deflect the fluid downward. A second louvered flat cascade is movably mounted on the bottom of the casings to retract or pivot into the casing and suitable means are provided to move the second cascade into an open position at an angle to the first cascade to intercept the deflected fluid from the first cascade. The second cascade is provided with variable camber louvers also which may be actuated differentially to control the further deflection of the intercepted deflected fluid from the first cascade. The second cascade can be moved into different intermediate angular fluid intercepting positions to vector the thrust as received from the first cascade. Preferred angular relationships are also disclosed.

While the specification includes claims particularly pointing out and distinctly claiming the subject matter which is regarded as the invention, it is believed the invention will be better understood from the following description taken in connection with the accompanying drawings in which:

FIG. 1 is a partial sectional view of a powerplant of the general type showing the second cascade in retracted and stowed position;

FIG. 2 is a partial view of FIG. 1 showing rotation of the second cascade and a vector diagram to illustrate an angular relationship of the cascades and the actuation forces required for operation of the second cascade;

FIG. 2a is a vector diagram of the forces on the second cascade;

FIG. 3 is a diagrammatic showing of a preferred angular relationship; and

FIGS. 4–6 are partial schematic line views of the two cascades illustrating different phases of operation obtainable with the cascades.

Referring first to FIG. 1 there is shown a typical cross-sectional view of the cascade arrangement employed in a cruise fan powerplant. In such a powerplant, the outer boundary is formed by casing 10 which may be a nacelle and may be supported by pylons from the wings of an aircraft or may be mounted in any of a number of well known means (not shown) for supporting jet propulsion powerplants on aircraft. For ease and simplicity of operation of the cascades to be described, casing member 10 preferably fairs into and terminates in a substantially rectangular opening 11 at its downstream end. While a rectangular opening is not necessary, it simplifies the construction and stowage of the cascades. With the fairing of casing 10 into the rectangular opening 11, a suitable portion of the casing is substantially rectangular in the forward area of the cascade stowage generally indicated at 12. While it will be appreciated that the powerplant may be a straight jet engine, it is preferable that it comprise a fan 13 which may be supported for rotation on centerbody 14 to provide streamlined aerodynamic flow of the thrust fluid through the engine. Fan 13 may conveniently be of the tip turbine type employing tip turbine buckets 15 that are driven by exhaust gas from gas generating means suitably located and not shown. A typical fan engine of the type shown in U.S. Patent 3,033,492 is suitable for use with the thrust deflection means of the instant invention.

In order to deflect the horizontal thrust fluid moving through the casing, a thrust deflection means is provided comprising a first single louvered cascade 16 which is flat or planar in the sense that it comprises a single component and is rectangular to fit in the opening 11 in the best manner. This cascade is disposed in the opening during operation and extends completely over the opening at an angle to the horizontal fluid movement through the casing. It is desired that the cascade extend completely across the opening so that, when it is operating, it intersects all of the thrust fluid all the time. It is possible to move the cascade out of the fluid stream into casing 10 when not operating, by any suitable means not shown. It would then assume the dotted position of FIG. 1.

In order to divert the thrust fluid to obtain a vertical component on the powerplant, the cascade is provided with a plurality of variable camber louvers 17 therein which may take any suitable form that permits varying the camber of the individual louvers. A typical structure for this purpose is shown in applicant's co-pending application Serial No. 294,049 filed July 10, 1963, U.S. Patent No. 3,172,621, and assigned to the assignee of the instant invention. The thrust fluid is deflected by these louvers as they are actuated by a suitable actuating means 18 which may differentially vary the camber of all the louvers. The louvers 17 are mounted in the cascade transverse to the opening 11 which, in conjunction with the rectangular opening and the extension of the cascade completely over the opening, ensures that maximum use of the louvers is made and all of the fluid is deflected. This cascade is disposed in the position shown to accommodate all of the deflected thrust operating conditions to which the powerplant will be subjected.

The relation between the cascades and the angles of the air entering and leaving the louvers is impulse condition. This condition is present when the area of the cascade normal to the inlet flow is equal to the area of the cascade normal to the discharge flow and the entering and leaving velocities are equal. In other words, with a constant area at the entry and discharge, the pressure change across the cascade is negligible and the effect on the fan is also negligible. Additionally, for maximum turning effect the cascade 16 is set at an angle of approximately 67° to the horizontal fluid movement as shown in FIG. 1.

In order that the deflected fluid be usable in short take-off applications, the arrangement shown in FIG. 1 is applicable and the cascade 16 may deflect the fluid downwardly and the vector of the downward thrust may be varied by varying the camber of the individual louvers.

When vertical take-off, requiring further deflection or even reverse thrust is desired, the thrust deflection means includes the use of a second louvered cascade 19 which, like cascade 16, is a preferably planar rectangular cascade and this cascade is movably mounted on the bottom of casing 10 as shown. As shown in FIG. 1, cascade 19, whose use will be explained in connection with FIG. 2 below, is retractable forward by actuation means 20 into a closed stowage position shown in a suitable recess in the bottom of the casing.

Referring next to FIG. 2, there is shown a partial view of the deflection end of a powerplant like that in FIG. 1, and the like numerals have been applied to like parts. In this figure the structure and function of cascade 16 is identical with that of FIG. 1. The additional second cascade 19 is fitted with variable camber louvers 21 that are preferably differentially operated by suitable actuation means 22. It will be seen that cascade 19 in this figure is pivotally mounted at its upstream end at 23 to the bottom of casing 10. It will be apparent that cascade 19 may be rotated, from its open position at an angle to cascade 16, clockwise into stowage position 24 in the bottom of casing 10. This structure will present more obstruction during retraction to the smooth flow of air around the powerplant than will the retractable structure shown in FIG. 1 but, under certain operating conditions, this may not be objectionable.

For varying degrees of deflection, cascade 19 is designed to control the further deflection of the intercepted fluid and to operate over a continuous range of intermediate angular fluid intercepting positions, one being shown in FIG. 2 whereby the angular position between the two cascades is changed. This intermediate positioning of the cascade plus the ability to position the individual variable louvers differentially provides continuous or wide vectoring of the diverted thrust in magnitude and direction. Also, it will be apparent that all of the fluid deflected by cascade 16 is, when the second cascade 19 is in open useful position, intercepted and further deflected by cascade 19.

There are preferred angular relationships between the directions of fluid flow entering and leaving the cascades. Reference to FIG. 3 will illustrate the optimum conditions. Impulse condition (as previously defined) across the cascades is desired. As to cascade 16, this occurs when angle B1, which is the angle shown between the entering fluid direction and the cascade axis, is equal to angle B2 which is the angle shown between the leaving fluid direction and the cascade axis. The same angular relationship is desired for cascade 19, i.e., angle B3 is equal to angle B4. It is also desired that the aerodynamic loading on each of the cascades be the same in order that the maximum flow turning angle required of either cascade will have the lowest possible value. This occurs when the turning angle produced in cascade 16 (B1 plus B2) is equal to that produced in cascade 19 (B3 plus B4). In other words, each cascade turns the flow the same amount.

There is also a preferred angular relationship between the cascades that follows from the above and results in a minimum length for each cascade, i.e., minimum hardware and weight. For convenience this is an angular relationship as measured from the vertical. As shown in FIG. 3 the angle A1 is the angle shown between the vertical and the plane of cascade 16. This angle A1 should be made equal to angle B1. The angle A2 is the angle shown between the vertical and the plane of cascade 19. The preferred relationship is to have this angle A2 equal to the sum of angles B1 plus B2 plus B3.

An item of practical importance in both constructions described is that the force vector produced by the second cascade 19 is always radially outward from the pivot point 23 when impulse conditions exist. A vector diagram will illustrate this as seen in FIG. 2a. As shown in FIG. 2, the arrows $x$ and $y$ enter and leave the second cascade 19 at angles B3 and B4 with the cascade axes respectively. It can be seen from the small vector diagram (FIG. 2a) off the end of the cascade that the change in direction of these two velocity vectors $x$ and $y$ is vector $r$ acting in the plane of the cascade as shown. In other words, $r$ is the direction and magnitude of the force required to turn the air through cascade 19. This force is resisted by an equal and opposite vector that acts through the pivot point 23. Since these forces act through pivot 23 it will then be obvious that the force required to move cascade 19 about the pivot point will be quite small. Even this small force may be supplied by the provision of the variable camber louvers in cascade 19. As previously stated, cascade 19 operates in the impulse condition, that is, with the area of the cascade normal to the inlet flow equal to the area of the cascade normal to the discharge flow and with the discharge velocity and static pressure equal in magnitude to the inlet velocity and static pressure respectively. In other words, the inlet and exit areas are equal and these areas are a function of the cosine of angles B. If the camber of louvers 21 is changed to reduce the exit area, the exit velocity is greater than the inlet velocity and a positive force is created on cascade 19 because of the resultant pressure change across the cascade. The increase of velocity can be represented on the vector diagram by moving vector $y$ to the dotted position $y'$ wherein a pressure difference is created across the cascade as shown by the plus and minus signs in FIG. 2 on each side of cascade 19. For the example just given, the cascade would be at higher pressure on the plus side and would therefore tend to have a force rotating it about pivot 23 toward the minus side. Summing up, closing down on the exit area by varying the camber sets up a pressure difference across the cascade which tends to rotate it in the direction desired. Opening the exit area will, of course, ensure rotation in the opposite direction.

Referring next to FIG. 4 diagram, the cascades are shown in an intermediate position as might be desired in one form of STOL or partial VTOL. The variable camber feature of the individual louvers combined with the movable feature of cascade 19 provides the most efficient placement and impulse setting of the cascades to achieve the vectored thrust desired.

In FIG. 5 a diagrammatic representation shows the reverse thrust mode in which greater camber of the individual louvers and angularity of the cascades can actually reverse the thrust fluid to a forward direction for braking as shown in FIG. 3.

FIG. 6 illustrates a STOL mode in which the cascade 16 deflects the thrust fluid downwardly and cascade 19 is retracted out of operating position. The same positioning of the cascades with the louvers of cascade 16 uncambered or in the straight through position is the cruise mode and this is also illustrated in FIG. 1 with the second cascade 19 retracted.

It will be apparent that a wide range of vectoring and reversal of the thrust is available with the tandem cascade arrangement. The combination of the fixed and movable cascades in conjunction with the variable camber louvers provides continuous angles of thrust vectoring as well as the low forces required for actual movement of the hardware components.

While there have been described preferred forms of the invention, obvious modifications and variations are possible in light of the above teachings. It is therefore to be understood that within the scope of the appended claims, the invention may be practiced otherwise than as specifically described.

What is claimed is:

1. Thrust deflection means for a jet propulsion powerplant including a casing member terminating in an opening at its downstream end and having means to move fluid through said casing to provide horizontal thrust, said deflection means comprising, a first louvered cascade disposed in operation completely over said opening at an angle to the horizontal fluid movement therethrough, variable camber louvers in said cascade, means connected to said louvers to vary the camber thereof to deflect the thrust fluid downward, a second louvered cascade movably mounted on said casing, means operable to move said second cascade as a unit from a closed stowed position out of said deflected fluid into open position at an angle to said first cascade to intercept said deflected fluid, variable camber louvers in said second cascade, and means connected thereto to vary the camber of the louvers to control the further deflection of said intercepted deflected fluid.

2. Apparatus as described in claim 1 wherein said first cascade is fixed in said casing across said opening.

3. Apparatus as described in claim 2 wherein said second cascade is movable into different intermediate angular fluid intercepting positions.

4. Apparatus as described in claim 3 wherein said second cascade is retractable forward into said closed stowed position out of said intercepting position.

5. Apparatus as described in claim 3 wherein said second cascade is pivoted at its upstream end to said casing to pivot into closed stowed position in said casing out of intercepting position.

6. Thrust deflection means for a jet propulsion powerplant including a casing member fairing into and terminating in a substantially rectangular opening at its downstream end and having fan means to move fluid through said casing to provide horizontal thrust, said deflection means comprising, a first single planar rectangular louvered cascade disposed completely over said opening at an angle to the horizontal fluid movement therethrough, variable camber louvers in said cascade transverse to said opening, actuating means connected to said louvers to vary the camber thereof differentially to deflect all said fluid downward, a second louvered planar rectangular cascade movably mounted on the bottom of said casing, means connected to said second cascade to move said second cascade as a unit from a closed stowed position out of said deflected fluid into open position at an angle to said first cascade to intercept said deflected fluid, variable camber louvers in said second cascade, and means connected to said second cascade louvers to vary the camber of all said louvers differentially to control the further deflection of said intercepted deflected fluid.

7. Apparatus as described in claim 6 wherein said first cascade is fixed in a rectangular portion of said casing across said opening.

8. Apparatus as described in claim 7 wherein said second cascade is movable into different intermediate angular fluid intercepting positions.

9. Apparatus as described in claim 8 wherein said second cascade is retractable forward into said closed stowed position at the bottom of said casing out of intercepting position.

10. Apparatus as described in claim 8 wherein said second cascade is pivoted at its upstream end to said casing to pivot into closed stowed position in the bottom of said casing out of intercepting position.

References Cited by the Examiner

UNITED STATES PATENTS

| 2,681,548 | 6/1954 | Kappus | 60—35.54 |
| 2,929,580 | 3/1960 | Ciolkosz | 244—12 |
| 2,932,164 | 4/1960 | Watson | 60—35.54 |
| 2,947,501 | 8/1960 | Flint. | |
| 3,016,700 | 1/1962 | Howald | 60—35.54 |
| 3,028,121 | 4/1962 | Klapproth | 244—23 |
| 3,035,792 | 5/1962 | Klapproth | 60—35.54 X |
| 3,040,524 | 6/1962 | Kurti | 60—35.54 |
| 3,087,303 | 4/1963 | Heinze et al. | 60—35.55 |

FOREIGN PATENTS

| 21,627 | 7/1961 | Germany. |
| 913,312 | 12/1962 | Great Britain. |
| 922,645 | 4/1963 | Great Britain. |

MARK NEWMAN, *Primary Examiner.*

A. L. SMITH, *Assistant Examiner.*